(12) United States Patent
Tuff et al.

(10) Patent No.: US 7,857,290 B2
(45) Date of Patent: Dec. 28, 2010

(54) AUTOMATED RAIL JACK

(76) Inventors: Nathaniel Tuff, 1663 Steuben St. #2, Utica, NY (US) 13501; Leroy Tuff, 1663 Steuben St. #2, Utica, NY (US) 13501

( * ) Notice: Subject to any disclaimer, the term of this patent is extended or adjusted under 35 U.S.C. 154(b) by 133 days.

(21) Appl. No.: 12/420,034

(22) Filed: Apr. 7, 2009

(65) Prior Publication Data
US 2010/0252790 A1    Oct. 7, 2010

(51) Int. Cl.
*B60S 9/02* (2006.01)
(52) U.S. Cl. .................. 254/418; 254/423; 254/419
(58) Field of Classification Search .............. 254/418, 254/423, 419, 420, 424–427, 41
See application file for complete search history.

(56) References Cited

U.S. PATENT DOCUMENTS

| | | | | |
|---|---|---|---|---|
| 5,224,688 A  * | 7/1993  | Torres et al. | ................ | 254/423 |
| 6,142,501 A  * | 11/2000 | Fogo et al.   | ................ | 280/475 |
| 6,224,040 B1 * | 5/2001  | Mejias et al. | ................ | 254/423 |
| 6,404,073 B1 * | 6/2002  | Chiang        | ................ | 307/10.1 |
| 6,527,254 B1 * | 3/2003  | Prevete       | ................ | 254/423 |
| 6,910,680 B1 * | 6/2005  | Geller        | ................ | 254/423 |
| 2002/0100901 A1 * | 8/2002 | Topelberg et al. | .......... | 254/423 |
| 2010/0213428 A1 * | 8/2010 | Ortiz         | ................ | 254/423 |
| 2010/0252790 A1 * | 10/2010 | Tuff et al.  | ................ | 254/423 |

* cited by examiner

*Primary Examiner*—Lee D Wilson
(74) *Attorney, Agent, or Firm*—Jerry Hagnes; Law Office of Jerry D. Haynes, P.A.

(57) ABSTRACT

The present invention relates to an automated jacking system for a motor vehicle that includes: a motorized jack; a rail system, where the rail system provides a means of movement for the motorized jack; and a control means, where the control means controls the movement of the motorized jack about the rail system. In one exemplary embodiment, the control means includes a control panel where the control panel includes at least four control buttons and each button coincides with a position of the motorized jack. During use, the rail system installs to the under carriage of a vehicle and includes a format that enables the motorized jack to position adjacent to a wheel of the vehicle. The present invention also includes a method of installing an automated jacking system to a motor vehicle.

10 Claims, 1 Drawing Sheet

AUTOMATED RAIL JACK

BACKGROUND OF THE INVENTION

1. Field of Invention

The present invention relates to an automated jacking system for a vehicle.

2. Description of Related Art

Vehicle jacks are well known in the prior art and are used principally to assist a user with changing tires on a vehicle. The prior art includes various types of manual and automated jacking systems that have been developed since the earlier years of automotive travel. The most widely prevalent manner of jacking or lifting a vehicle includes the use a manually jack that attaches to the bumper or frame of vehicle at designated points. The manual jack is usually cranked in some manner in order to lift the vehicle in order to change a desired wheel.

In addition to manual jacks, the prior art includes examples of self contained jacking systems that may be attached to the vehicle frame or axles. Some specific examples include U.S. Pat. No. 5,713,560, which discloses a hydraulic jack system operable from the dashboard of an automobile. The system provides a means to raise the front right, front left, rear right or rear left portions of an automobile by way of the front or rear axles. The system achieves this through the use of four separate hydraulic jacks, two positioned at either end of the front axle and two positioned at either end of the rear axle.

Another earlier exemplary jack system includes U.S. Pat. No. 1,953,687, that discloses an automobile jack permanently mounted to the car, which includes construction of four jacks, one for each wheel and the jacks are operated by a motor. The prior art of self contained jacks therefore include systems that require multiple jacks and are systems that are not used within the present automotive industry. Consequently, further development is necessary in the area of automated jacking systems.

SUMMARY OF THE INVENTION

The present invention relates to an automated jacking system for a motor vehicle comprising: a motorized jack; a rail system, where the rail system provides a means of movement for the motorized jack; and a control means, where the control means controls the movement of the motorized jack about the rail system. In one exemplary embodiment, the control means includes a control panel where the control panel includes at least four control buttons and each button coincides with a position of the motorized jack. During use, the rail system installs to the under carriage of a vehicle and includes a format that enables the motorized jack to position adjacent to a wheel of the vehicle. The present invention also includes a method of installing an automated jacking system to a motor vehicle.

DETAILED DESCRIPTION

The present invention relates to an automotive jacking system that provides an automated jack for lifting a vehicle. The present invention alleviates the manual labor usually associated with the jacking of a car in order to change a tire. The present invention provides an automated process where a jack is automatically positioned near a wheel of a vehicle and raises the vehicle to appropriate height in order to change a tire.

Figure 2:
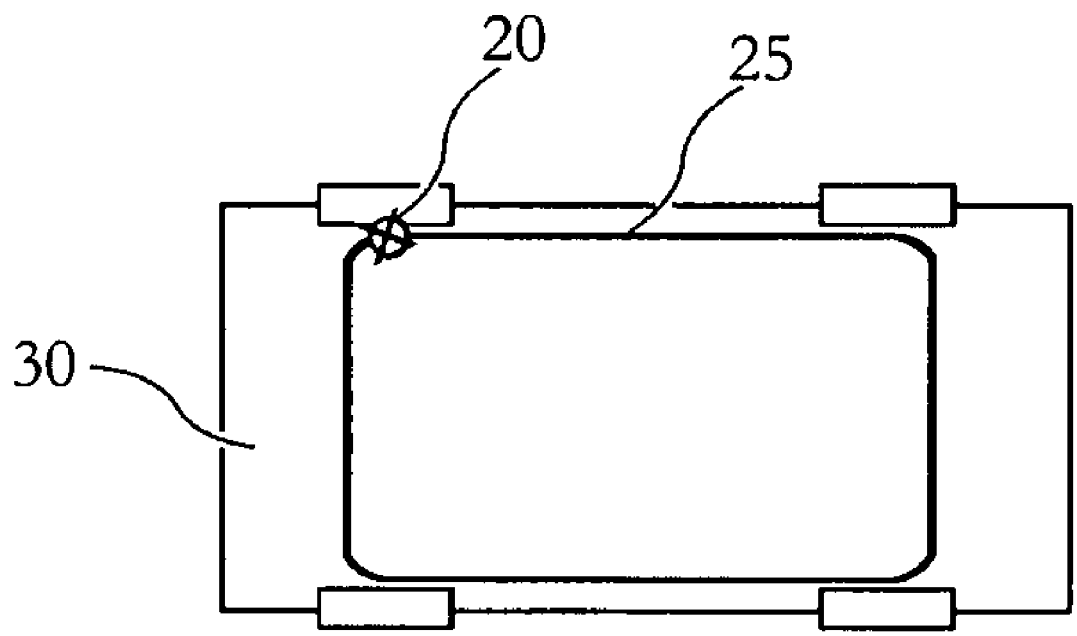
FIG. 2 depicts an undercarriage view a vehicle that includes the automated jacking system according to the present invention.

The jacking system according to the present invention includes a rail system 25 installed on the underside of a vehicle, wherein said rail system which is enclosed forming a closed continuous circuit having said rail adjacent to a front side, a rear side, a passenger side and a driver side being mounted underneath said vehicle. The rail system 25 installed underneath the vehicle is depicted in FIG. 2. Along the rail system 25 is positioned a jack 20 which is guided by the rail system 25. The jack 20, in addition to having hydraulic components to enable the lifting of the vehicle, includes an electronic controlled motor that moves the jack along the rail 25.

Figure 1:
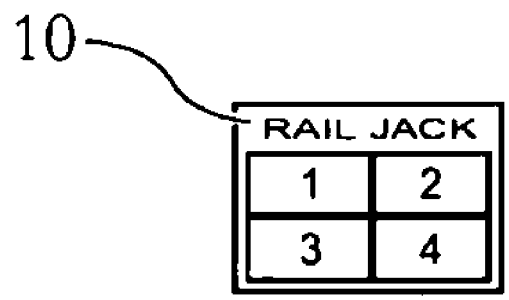
FIG. 1 depicts a control panel according to the present invention.

A control panel 10 depicted in FIG. 1 controls the jack 20. The control panel 10 includes four buttons that are associated with each wheel of a vehicle. The control panel is placed on the inside panel of a vehicle 30 which includes the automatic jacking system of the present invention. A user depresses one of the buttons in order to position the jack 20 adjacent to the object wheel. Once the user activates one of the control buttons, the jack positions itself next to the wheel associated with the control number on the control panel. The control numbers are not fixed to a particular wheel until installed onto the vehicle. Therefore a user may have the option to designate each wheel to any desired number on the control panel.

During operation the user actuates one of the control buttons. The jack 20 positions itself by the selected wheel and then lowers onto the ground and effectuates a lifting of the vehicle 30 at the particular wheel which may have a flat tire. The advantages of using the automated jacking system according to the present invention include the elimination of the manual jacking of a vehicle that is customary in the prior art. Also the jacking system according to present invention provides a quicker method of lifting a vehicle in order to change the tire. The automated jacking system of the present invention may be installed on existing vehicles or included as an accessory on new vehicles as manufactured. The guide rails 25 may be designed for the various frames that presently exist on vehicles or customized to fit any vehicle type. Once the rail 25 and jack 20 are in place a user may use this system in order to jack or raise the vehicle to appropriate heights for tire changing purposes.

An additional feature of the jacking system according to present invention includes the power supply associated with the system. The automated jacking system includes a battery installed within the jack 20 that supplies power to the jacking system. The power system for this automated jacking system therefore is self-contained and separate from the automobile battery. The battery associated with the automated jacking system however may be recharged via connections to the alternator system of the vehicle 30. The rail system 25 according to present invention may be manufactured of strong metal materials such as aluminum which is also lightweight but durable. The instant invention has been shown and described in what is considered to be the most practical and preferred embodiments. It is recognized, however, that departures may be made there from within the scope of the invention and that obvious modifications will occur to a person skilled in the art.

What is claimed is:

1. An automated jacking system for a vehicle comprising:
   a. a motorized jack;
   b. a rail system, where the rail system provides a means of movement for the motorized jack wherein said rail system which is enclosed forming a closed continuous circuit having said rail adjacent to a front side, a rear side, a passenger side and a driver side being mounted underneath said vehicle; and c. a control means, where the control means controls the movement of the motorized jack about the rail system.

2. The automated jack system according to claim 1, wherein the control means includes a control panel where the control panel includes at least four control buttons.

3. The automated jack system according to claim 1, wherein the rail system installs to the under carriage of a vehicle.

4. The automated jack system according to claim 3, wherein the rail system includes a format enables the motorized jack to position adjacent to a wheel of the vehicle.

5. The automated jack system according to claim 4, wherein the control means includes a control panel where the control panel includes at least four control buttons and each button coincides with a position of the motorized jack.

6. The automated jack system according to claim 1, wherein the motorized jack includes a battery, where the battery supplies power to the motorized jack.

7. A method of installing a self-contained jacking system onto a vehicle comprising the steps of:

a. installing a rail system wherein said rail system which is enclosed forming a closed continuous circuit having said rail adjacent to a front side, a rear side, a passenger side and a driver side being mounted to the undercarriage of a vehicle;

b. placing a motorized jack onto the rail system; and c. connecting a control means to the motorized jack.

8. The method of installing a self-contained jacking system according to claim 7, further comprising the steps of:

a. programming the control means, wherein said programming controls the movement and positioning of the motorized jack;

b. installing said control means on the interior of the vehicle.

9. The method of installing a self-contained jacking system according to claim 8, wherein said control means includes a control panel with at least four control buttons, further comprising the step of designating a specific position for the motorized jack.

10. The method of installing a self-contained jacking system according to claim 9, wherein each designated position places the motorized jack adjacent to a wheel of the vehicle.

* * * * *